INVENTORS
RUDOLF BORMANN &
CARL DETHLEFSEN

BY Eric D. Frankel

PATENT AGENT

INVENTORS
RUDOLF BORMANN
& CARL DETHLEFSEN
BY [signature]
PATENT AGENT 2,846,217
Patented Aug. 5, 1958

2,846,217

MAGNETIC TAPE DRIVE

Rudolf Bormann, Hamburg-Fuhlsbuttel, and Carl Dethlefsen, Hamburg-Stellingen, Germany, assignors to Telefunken G. m. b. H., Berlin, Germany Application June 13, 1957, Serial No. 665,540

Claims priority, application Germany June 23, 1956

6 Claims. (Cl. 271—2.3)

The present invention relates to a drive mechanism for magnetic sound recording and reproducing apparatus.

Magnetic sound recording and reproducing apparatus employing magnetic tape as the sound carrier have been known in which the tape is guided from a supply reel and directed about one or more idler rollers past magnetic heads beyond which the tape is driven by pressing it against a rotating capstan by means of a pressure roller having a resilient periphery. Thereafter, the tape is again directed and guided to a take-up reel. Generally, the drive capstan feeding the tape is continuously driven and the advance of the tape is stopped by retracting the pressure roller therefrom. Since the driving capstan is located beyond the magnetic heads, as viewed in the direction of advance of the tape, the tension of the tape in the vicinity of the heads depends first upon the inertia of the coiling motor coupled with the supply reel and acting as brake, which is practically constant within the speed range used and, second, on the diameter of the supply reel. It is possible to provide in tape feeding mechanism such means that keep the tension of the tape constant to a great extent, although such means would not exclude momentary or temporary fluctuations in the tape tension caused, for example, by tape end-splices, eccentricities of the supply reel, vibrations of the feed rollers, or non-uniform running of the motor.

It is an object of the present invention to provide constant tape tension and to exclude the actions of these momentary fluctuations in tape tension on the magnetic heads.

It is another object of the invention to provide in a magnetic sound recording and reproducing apparatus of the kind described a drag roller, having a braking force applied thereto and having considerable inertia ahead of the magnetic heads as viewed in the running direction of the tape, wherein coupling between the tape and the roller is also effected by means of a pressure roller having a resilient periphery, said pressure roller being retracted simultaneously with the driving pressure roller when the advance of the tape is to be stopped. In addition to this, a clutch means is provided between the drive capstan and the drag roller, whereby when the pressure rollers are retracted, the drag roller which is then unbraked is driven at a speed corresponding to that of the drive roller; and whereby this clutch means is released when the pressure rollers are reapplied while, at the same time, the brake force of the drag roller will be again rendered effective.

German Patent No. 837,174 discloses a device for obtaining constant tape tension, wherein an idler roller is provided in front of the magnetic head as viewed in the direction of advance of the tape and another idler roller beyond the drive capstan, whereby said idler rollers are adapted to be displaced by means of adjustable springs, the tensions of which are varied in accordance with the varying tape tension beyond and in front of the tape reels, in such a manner, that the advance of the tape may be selectively retarded. An increase of the drag at the supply reel results in a decrease of the retarding action at the idler roller adjacent to the said supply reel, while an increase in the tension force from the take-up reel results in an increase in the retarding action at the other idler roller.

This arrangement has the disadvantage that the springs which are responsible for the retarding action have to be adjusted from time to time, and that the retarding action mechanically effected at the idler rollers by means of brake shoes may disturb the magnetic heads, due to irregularities on the braking surfaces.

Swiss Patent No. 269,220 shows that it has been known to provide in front of and beyond the drive capstan auxiliary driving or feeding means mechanically connected with said drive capstan, and to arrange the sound carrier to include a tensionless loop between each auxiliary feed means and the drive capstan.

In contrast to this, the present invention avoids loop formations in the sound carrier and also sensitive adjusting of braking means required with the apparatus according to the prior art.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
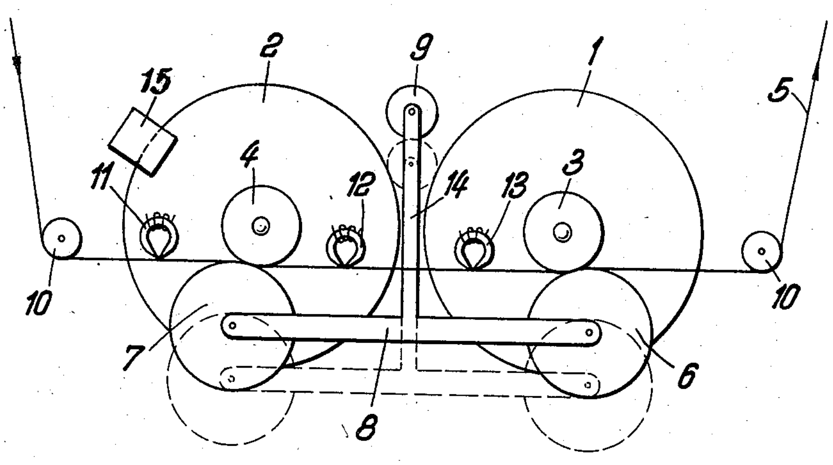
Figure 1 shows schematically a top view of an embodiment of a driving mechanism for magnetic sound recording and reproducing apparatus according to the invention.

Referring now to Figure 1 of the drawings, a sound carrier or magnetic tape 5 is driven in the direction of the arrows by means of a continuously and uniformly running motor (not shown) via a drive capstan 3 when a pressure roller 6 is applied to the tape 5 pressing it against this drive capstan 3. The pressure roller 6 is rotatably mounted on one end of a bar 8, the other end of which carries a rotatable second pressure roller 7, the function of which will be explained later. The bar 8 and its associated pressure rollers 6 and 7 have two positions, i. e., a stop position, indicated by dash-dash lines, in which the tape is disengaged from forward drive, because the pressure roller 6 is retracted from the tape 5 so that the latter is no longer in frictional engagement with the drive capstan 3 and cannot be advanced thereby, although the drive motor continues to rotate the capstan 3. The second position, indicated in full lines, is the operative position in which the pressure roller 6 is engaged with the tape 5, so that the latter will be driven by the continuously rotating capstan 3. In the latter position, the second pressure roller 7 presses the magnetic tape on a drag roller 4. Flywheels 1 and 2 are mounted on the drive capstan 3 and the drag roller 4, respectively, so that these flywheels rotate together with the capstan 3 and the roller 4 at the same speed. It is desirable to avoid driving the drag roller 4 at a higher speed than the motor-driven capstan 3 via the tape 5, because there may exist a time lag during which the respective flywheels are approaching identical rates of revolution, whereby a portion of the tape will pass without being played. In addition to this, unpermissibly high tape tensions are obtained when the inertia of flywheel 2 is too large. For this reason, an arm 14 is provided at the center of the bar 8, said arm carrying at its free end a roller 9 adapted to frictionally engage both flywheels 1 and 2 when the bar 8 is in the stop position indicated by dash-dash lines. When the drive motor is energized to drive the capstan 3, its flywheel 1 is rotated and, in the stop position of the bar 8, the roller 9 freely journalled on the end of the arm 14 transmits the drive from the flywheel 1 to the flywheel 2 and, thereby, to the drag roller 4. Thus, when the sound recording and reproducing apparatus is switched on and the bar 8 is in the stop position, the two flywheels 1 and 2 will be rotated at the same speed by the drive motor and coupled together by the roller 9. If now the pressure rollers 6 and 7 are brought in engagement with the tape 5 by shifting the bar 8 from the stop position to the operating position, shown in full lines, the roller 9 will be retracted from the two flywheels, which will continue to run at the same speed coupled by the tape. No loss in tape contact will occur, because the two flywheels have already reached their proper speed and the circumferential velocities of the capstan 3 and the drag roller 4 are the same. When the pressure rollers are applied, an eddy current brake 15 will simultaneously be energized, said brake being adapted and arranged to act on the drag roller fly-wheel 2. The drag force of this brake is adjusted in such a manner that the tape tension required for proper contact of the tape on a recording head 12 and/or pick-up head 13 is maintained. It does not matter where an erasing head 11 is arranged, i. e., this head might be provided either between the drag roller 4 and the drive capstan 3 or, as shown in Figure 1, between the drag roller 4 and the left idler roller 10, which is one of a pair of idler rollers 10 disposed on opposite sides of the drive mechanism.

As has been already mentioned, the tension of the tape in front of the pressure roller 7 is dependent upon the diameter of the supply reel. In view of the fact that the total tension of the tape in front of the magnetic heads comprises the tape tension caused by the supply reel and the retarding tension caused by the eddy current brake, the component attributable to the supply reel should be made as small as possible in order to obtain a tape tension as constant as possible over the total length of the tape. It is evident that with the new arrangement, momentary fluctuations in the tension of the tape, as mentioned in the introduction, will no longer affect the magnetic heads.

Figure 2:
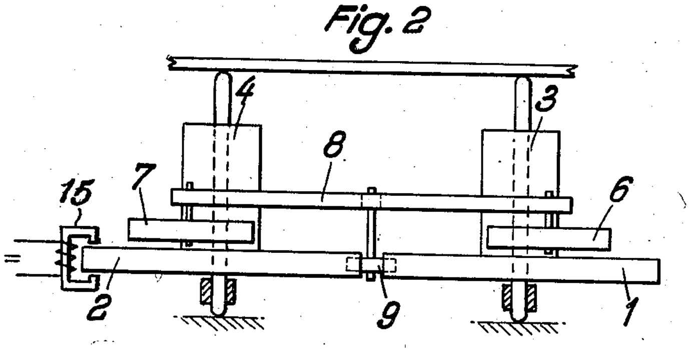
Figure 2 is a front view of the apparatus according to Figure 1.

In the front view shown in Figure 2, the same reference numerals are applied to the same parts. While, according to Figure 2, the pressure rollers 6 and 7 are mounted below the bar 8, they can be disposed above the latter without difficulty.

Figure 3:
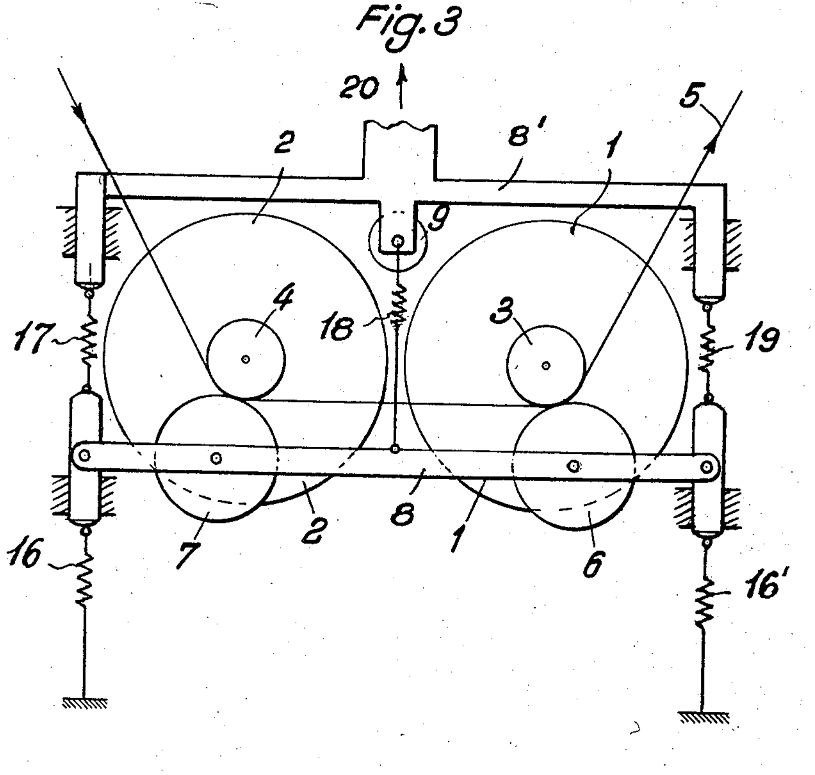
Figure 3 illustrates schematically a top view of another embodiment of a drive mechanism for magnetic sound recording and reproducing apparatus according to the present invention.

In the embodiment illustrated in Figure 3, the bar 8 carrying the rollers 6, 7 is resiliently suspended by a network of springs.

The bar 8 is slidably located in bearings. Springs 16, 16' are fastened to any fixed point of apparatus and tends to urge the bar 8 and consequently the idler rollers 6, 7 away from the capstan 3 and roller 4.

A bar 8' forms a bearing for the roller 9. The bar 8' and the bar 8 are connected by springs 17, 18, 19. By urging the bar 8' in the direction of arrow 20, roller 9 is disengaged from the flywheels 1, 2. Under the tension of the springs 17, 19, the idler rollers 6, 7 are engaged with the capstan 3 and roller 4, thereby coupling the tape 5 with them.

Movement of the bar 8' against the direction of arrow 20 will cause a returning of bars 8 and 8' under the tension of springs 16, 16' as to free the idler rollers 6, 7 from the capstan roller 3 and roller 4 and coupling the roller 9 rotatably mounted on an arm of bar 8' with flywheels 1 and 2.

We claim:

1. Drive mechanism for a magnetic recording and reproducing apparatus employing magnetic tape as the signal carrier, said apparatus having a continuously driven capstan to advance the tape, a pressure roller adapted to press the tape against the capstan, and said apparatus including magnetic head means disposed adjacent the tape ahead of the capstan, said mechanism comprising a drag roller adjacent the tape ahead of said head means; a second pressure roller disposed on the other side of the tape opposite the drag roller, a bar disposed transversely of the axes of said two pressure rollers, the latter being journalled thereon for unitary displacement toward and away from the peripheries of the capstan and the drag roller, respectively, and clutch means capable of connecting the capstan and drag roller together for rotation in the same direction at the same peripehral velocity; and means for connecting said clutch means to said bar, whereby the clutch means is disengaged when the bar is moved to press the pressure rollers against the tape and force the latter against the capstan and drag roller, and the clutch means is engaged when the bar is moved to retract the pressure rollers.

2. In a mechanism as set forth in claim 1, brake means operative to oppose the rotation of said drag roller and adapted to be rendered operative when said bar is moved to press the pressure rollers against said tape.

3. In a mechanism as set forth in claim 1, said clutch means comprising an idler roller disposed to engage peripheral surfaces respectively associated both with the capstan and with the drag roller, and said connecting means being connected at one end to the bar and at the other end to a support on which said idler roller is journalled and the idler roller being located on the other side of a plane containing the axes of the capstan and drag roller from said bar.

4. In a mechanism as set forth in claim 3, said connecting means comprising an arm secured to the bar at one end and to the idler roller support at the other end.

5. In a mechanism as set forth in claim 3, said connecting means comprising a tension spring secured to the bar at one end and to the idler roller support at the other end.

6. In a mechanism as set forth in claim 5, tension spring means connected to said support and urging the latter away from said plane containing said axes, said spring means being more yieldable than said spring.

References Cited in the file of this patent

UNITED STATES PATENTS

| | | |
|---|---|---|
| 2,577,652 | Dibble | Dec. 4, 1951 |

FOREIGN PATENTS

| | | |
|---|---|---|
| 503,128 | Belgium | May 31, 1951 |
| 679,817 | Great Britain | Sept. 24, 1951 |